US008184503B2

(12) United States Patent
Turcotte et al.

(10) Patent No.: US 8,184,503 B2
(45) Date of Patent: May 22, 2012

(54) PROCESS MEASUREMENT INSTRUMENT WITH TARGET REJECTION

(75) Inventors: Christopher P. Turcotte, Brookfield, IL (US); Kevin M. Haynes, Lombard, IL (US)

(73) Assignee: Magnetrol International, Incorporated, Downers Grove, IL (US)

( * ) Notice: Subject to any disclaimer, the term of this patent is extended or adjusted under 35 U.S.C. 154(b) by 358 days.

(21) Appl. No.: 12/454,444

(22) Filed: May 18, 2009

(65) Prior Publication Data
US 2010/0290314 A1 Nov. 18, 2010

(51) Int. Cl.
*G01S 15/00* (2006.01)
(52) U.S. Cl. .............................. 367/87; 367/908; 367/99
(58) Field of Classification Search .................. 367/87, 367/908
See application file for complete search history.

(56) References Cited

U.S. PATENT DOCUMENTS

| | | | | |
|---|---|---|---|---|
| 4,221,004 | A * | 9/1980 | Combs et al. .................. | 367/114 |
| 4,572,253 | A * | 2/1986 | Farmer et al. ................. | 141/95 |
| 4,578,997 | A * | 4/1986 | Soltz ............................. | 73/290 V |
| 4,596,144 | A | 6/1986 | Panton et al. | |
| 4,700,569 | A * | 10/1987 | Michalski et al. .......... | 73/290 V |
| 4,868,797 | A * | 9/1989 | Soltz .............................. | 367/98 |
| 4,992,998 | A * | 2/1991 | Woodward .................... | 367/99 |
| 5,036,892 | A * | 8/1991 | Stembridge et al. ......... | 141/1 |
| 5,131,271 | A * | 7/1992 | Haynes et al. .............. | 73/290 V |
| 5,319,974 | A * | 6/1994 | Lenz et al. .................. | 73/290 V |
| 5,691,712 | A * | 11/1997 | Meek et al. ................ | 340/853.3 |
| 2004/0076079 | A1* | 4/2004 | Lyon et al. .................. | 367/99 |
| 2004/0246862 | A1* | 12/2004 | Cho et al. .................. | 369/59.22 |
| 2005/0184869 | A1* | 8/2005 | Micko .......................... | 340/567 |
| 2007/0049977 | A1* | 3/2007 | Von Arx et al. .............. | 607/9 |
| 2007/0124789 | A1* | 5/2007 | Sachson et al. ............. | 725/117 |
| 2007/0288234 | A1* | 12/2007 | Huo et al. .................... | 704/219 |
| 2008/0126662 | A1* | 5/2008 | Rajbharti .................... | 710/308 |
| 2009/0020002 | A1* | 1/2009 | Williams et al. ............ | 89/41.03 |
| 2009/0323977 | A1* | 12/2009 | Kobayashi et al. .......... | 381/71.8 |

FOREIGN PATENT DOCUMENTS

| | | |
|---|---|---|
| EP | 0 780 665 A2 | 6/1997 |
| GB | 2 230 608 A | 10/1990 |
| WO | WO 01/13075 A1 | 2/2001 |

OTHER PUBLICATIONS

Yi Liu; Lynnworth, L.C.; , "Flexural wave sidewall sensor for noninvasive measurement of discrete liquid levels in large storage tanks," Ultrasonics Symposium, 1993. Proceedings., IEEE 1993, pp. 385-390 vol. 1, Oct. 31-Nov. 3, 1993.*

* cited by examiner

*Primary Examiner* — Thomas Tarcza
*Assistant Examiner* — James Hulka
(74) *Attorney, Agent, or Firm* — Wood, Phillips, Katz, Clark & Mortimer

(57) ABSTRACT

A process measurement instrument with target rejection comprises a sensor circuit. The sensor circuit comprises a drive circuit for transmitting a pulse signal at a target of interest and a receive circuit receiving reflected echoes of the pulse signal and developing an analog receive signal representative of the reflected echoes. An analog processing circuit receives the analog receive signal and comprises a summer subtracting an analog target rejection signal from the analog receive signal to develop a corrected receive signal. A programmed digital processing circuit is operatively coupled to the analog processing circuit and comprises a memory storing target rejection signal value data representing false target reflections and developing the analog target rejection signal for transfer to the analog processing circuit.

20 Claims, 6 Drawing Sheets

PROCESS MEASUREMENT INSTRUMENT WITH TARGET REJECTION

CROSS REFERENCE TO RELATED APPLICATIONS

There are no related applications.

FIELD OF THE INVENTION

This invention relates to a process control instrument, and more particularly, to a measurement instrument with target rejection.

BACKGROUND OF THE INVENTION

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to sensed level.

An electrical transmitter must be connected to an electrical power source to operate. One form of such transmitter, known as a four-wire transmitter, includes two terminals for connection to a power source and two terminals for carrying the output signal proportional to the process variable. Where transmitters are remotely located, the requirement for four conductors can be undesirable due to the significant cost of cabling. To avoid this problem, instrument manufacturers have developed devices known as two-wire, or loop powered, transmitters. A two-wire transmitter includes two terminals connected to a remote power source. The transmitter loop current, drawn from the power source, is proportional to the process variable. The typical instrument operates off of a 24-Volt DC source and varies the signal current in the loop between 4 and 20 milliamps DC. Because of these operating requirements, the design of the transmitter in terms of power consumption is critical. For example, when a low level signal of 4 milliamps is transmitted, there is minimal power available to be consumed by the instrument. Therefore, circuits must be designed to operate off of such minimal available power. More recently, designs have been proposed which use wireless technology for transmitting information on the process variable. Such devices may be battery powered. Again, the design of the transmitter in terms of power consumption is critical to avoid premature wearing down of the battery.

Various industrial distance or level sensing devices operate by emitting bursts of energy, usually acoustic or electromagnetic, and measure the time required for reflected echoes to return from the material surface of interest. The distance is derived from the propagation speed of the energy burst and the elapsed time of the echo travel for the echo returning from the target of interest. Recent instruments of this type use a combination of analog and digital circuits and include a microcontroller. A microcontroller typically consists of a microprocessor, sometimes referred to as a central processing unit, program memory, data memory, and peripheral devices such as analog to digital and digital to analog converters, memory controllers, serial communication ports, timers, etc. As noted above, the supply energy may be very limited. Moreover, in hazardous application environments the sensor supply energy may be very limited, to preclude the possibility of igniting flammable substances.

Signal processing methods that require substantial run time microprocessor activity to accurately perform echo location tasks conflict with the requirement that the device consume minimal amounts of electricity, or result in low measurement update rates. Analog circuit methods for determining echo time of flight can measure efficiently and accurately but can be triggered by transient electrical noise or spurious signals resulting in erroneous measurements.

Distance measuring devices that operate by emitting bursts of energy are hindered in many application environments by spurious reflections. Spurious reflections, also referred to as false targets, are usually caused by extraneous objects that reflect the emitted energy. They may also result from unintended return paths. A measurement instrument must be capable of rejecting spurious reflections or its suitable applications will be limited.

Signal processing devices that require substantial run time involvement of a microprocessor have been used to reject spurious reflections by, for example, continuously digitizing echo signals and processing the acquired data mathematically. However, applications that allow for minimal amount of electricity limit available digital processing power.

The present invention is directed to improvements in measurement instruments.

SUMMARY OF THE INVENTION

In accordance with the invention, there is provided a process measurement instrument with target rejection.

There is disclosed in accordance with one aspect of the invention a process measurement instrument with target rejection comprising a sensor circuit. The sensor circuit comprises a drive circuit for transmitting a pulse signal at a target of interest and a receive circuit receiving reflected echoes of the pulse signal and developing an analog receive signal representative of the reflected echoes. An analog processing circuit receives the analog receive signal and comprises a summer subtracting an analog target rejection signal from the analog receive signal to develop a corrected receive signal. A programmed digital processing circuit is operatively coupled to the analog processing circuit and comprises a memory storing target rejection signal value data representing false target reflections and developing the analog target rejection signal for transfer to the analog processing circuit.

It is a feature of the invention that the analog processing circuit comprises a comparator that compares the corrected receive signal to a select threshold level to develop a data signal representative of location of a target of interest.

It is another feature of the invention that the sensor circuit comprises an ultrasonic transducer.

It is a further feature of the invention that the analog processing circuit comprises an envelope detector rectifying the analog receive signal and a second summer subtracting the analog target rejection signal from the rectified analog receive signal to develop a corrected envelope waveform delivered to the programmed digital processing circuit. The digital processing circuit may periodically update the stored target rejection signal value data using the corrected envelope waveform.

It is a further feature of the invention that the digital processing circuit comprises a direct memory access controller transferring the stored target rejection signal values to a digital to analog converter to develop the analog target rejection signal. Timing of the analog target rejection signal may be controllably varied responsive to signal propagation speed changes. The direct memory access controller may automatically increment a source address until all target rejection signal values stored in the memory have been transferred to the digital to analog converter.

There is disclosed in accordance with another aspect of the invention a through air level measurement instrument comprising a sensor comprising a transducer for transmitting a pulse signal at a target of interest and receiving reflected echoes of the pulse signal and developing an analog receive signal representative of the reflected echoes. An analog processing circuit is operatively coupled to the sensor circuit for receiving the analog receive signal and comprising a summer subtracting an analog target rejection signal from the analog receive signal to develop a corrected receive signal. A programmed digital processing circuit is operatively coupled to the analog processing circuit and comprises a memory storing target rejection signal value data representing false target reflections and developing the analog target rejection signal for transfer to the analog processing circuit.

There is disclosed in accordance with another aspect of the invention a through air level measurement instrument comprising a sensor comprising a transducer for transmitting a pulse signal at a target of interest and receiving reflected echoes of the pulse signal and developing an analog receive signal representative of the reflected echoes. An analog processing circuit receives the analog receive signal and comprises a summer subtracting an analog target rejection signal from the analog receive signal to develop a corrected receive signal. A microcontroller is operatively coupled to the analog processing circuit to develop the analog target rejection signal and comprises a memory storing target rejection signal value data representing false target reflections and developing the analog target rejection signal for transfer to the analog processing circuit.

Further features and advantages of the invention will be readily apparent from the specification and from the drawings.

DETAILED DESCRIPTION OF THE INVENTION

Figure 1:
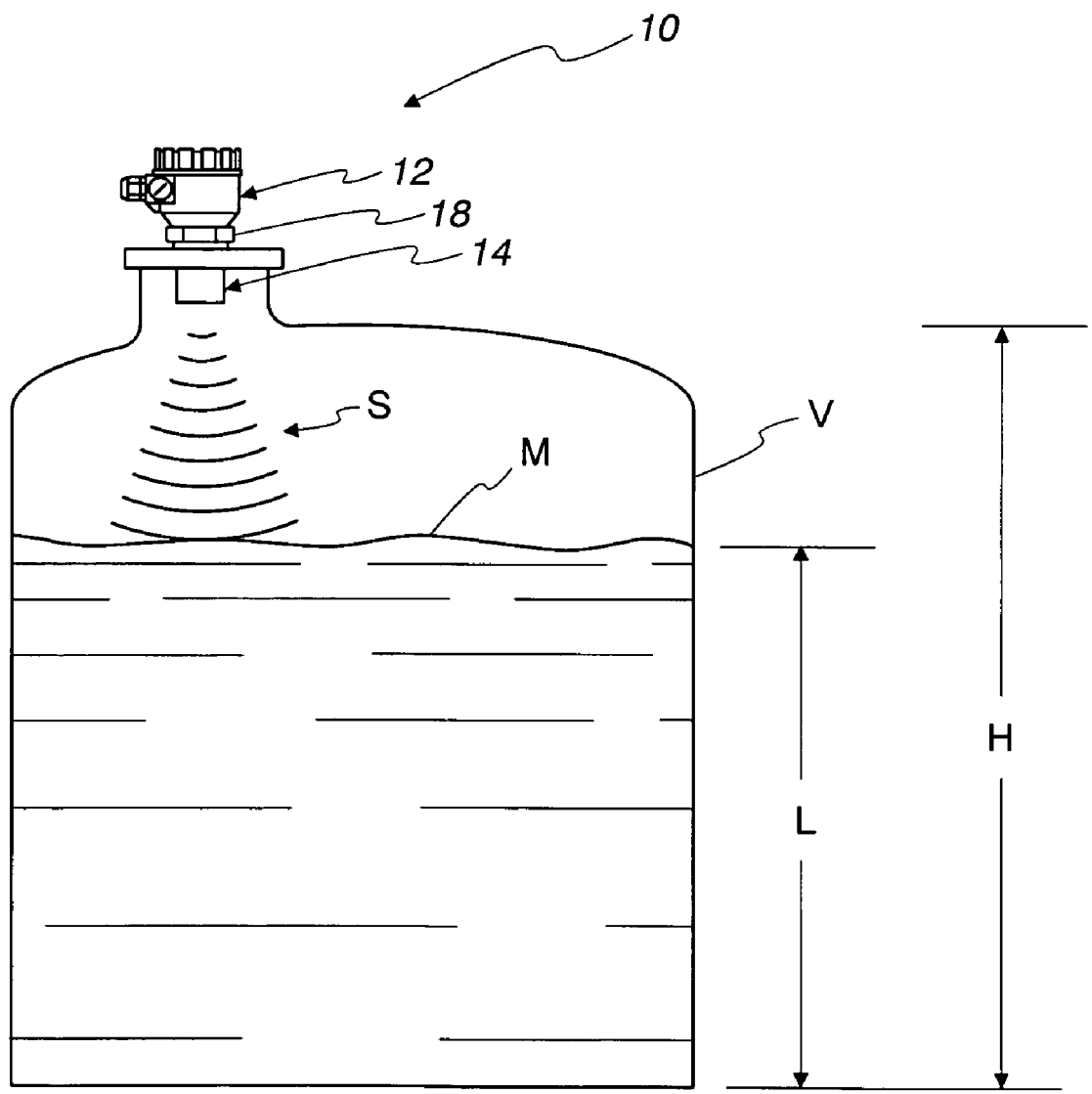
FIG. 1 is a side elevation view of a measurement instrument in accordance with the invention mounted in a process vessel.

Referring to FIG. 1, a process instrument 10 according to the invention is illustrated. The process control instrument 10 uses bursts of energy for measuring a level based on time required for reflected echoes to return from the material surface of interest. Particularly, the instrument 10 uses through air ultrasound for sensing level.

While the embodiments described herein relate to an ultrasonic level sensing apparatus, various aspects of the invention may be used with other types of process control instruments for measuring various process parameters, such as a distance or range finder, as will be apparent to those skilled in the art. Moreover, the instrument may use other forms of energy where the instrument measures time required for reflected echoes to return from the material surface of interest. Distance is derived from the propagation speed of the energy burst and the elapsed time of the echo travel for the echo returning from the target of interest. This distance can represent location of the material surface of interest, and thus can represent level by knowing the distance from the instrument relative to distance to the bottom of a vessel, or measuring flow when used in connection with a flume, as is known.

The instrument 10 includes a control housing 12 and a transducer 14 connected by a threaded fitting 18 for connection to a process vessel V. In accordance with the invention, a signal S in the form of bursts of energy is emitted from the transducer 14 and subsequently reflected from a surface of the material M. The distance is calculated by the equation $$D = (\text{velocity of } S \text{ propagation}) * \text{transit time (round trip)}/2.$$

Level is then calculated by applying a tank height value, where L=H−D.

In accordance with the invention, the instrument 10 utilizes improved measurement system design embodying false target rejection by combining digital signal processing and analog hardware signal detection. The received analog signal generated from the emitted energy reflections, in the form of echoes, is used for the primary time of flight measurement. Derived envelope waveform data is acquired by the instrument's microprocessor and used to determine false target rejection data. The false targets may comprise appurtenances in the vessel, such as ladders, mixers, etc. This system accomplishes accurate and robust measurement very efficiently.

In accordance with the invention, portions of an echo signal waveform that correspond to false target reflections can be captured and digitized by a microcontroller using an analog to digital converter (ADC) and stored in non-volatile memory. Once captured, the false target signal data can be converted back to an analog signal using a digital to analog converter (DAC) and then inverted and combined with dynamic echo signals using analog mixing hardware to effectively eliminate the spurious reflections. The output of the target rejection signal over time can be achieved by employing a direct memory access (DMA) controller, as a microcontroller peripheral, in combination with a timer to transfer data to a DAC register. If necessary, the output timing of the target rejection signal data can be adjusted to compensate for changes in propagation speed. Other than initial set up of various microcontroller registers and one time processing of the signal data, this method does not require involvement of the microprocessor or CPU, which can therefore operate more effectively in multi-tasking environments and at lower clock rate, thereby reducing power consumptions.

Figure 2:
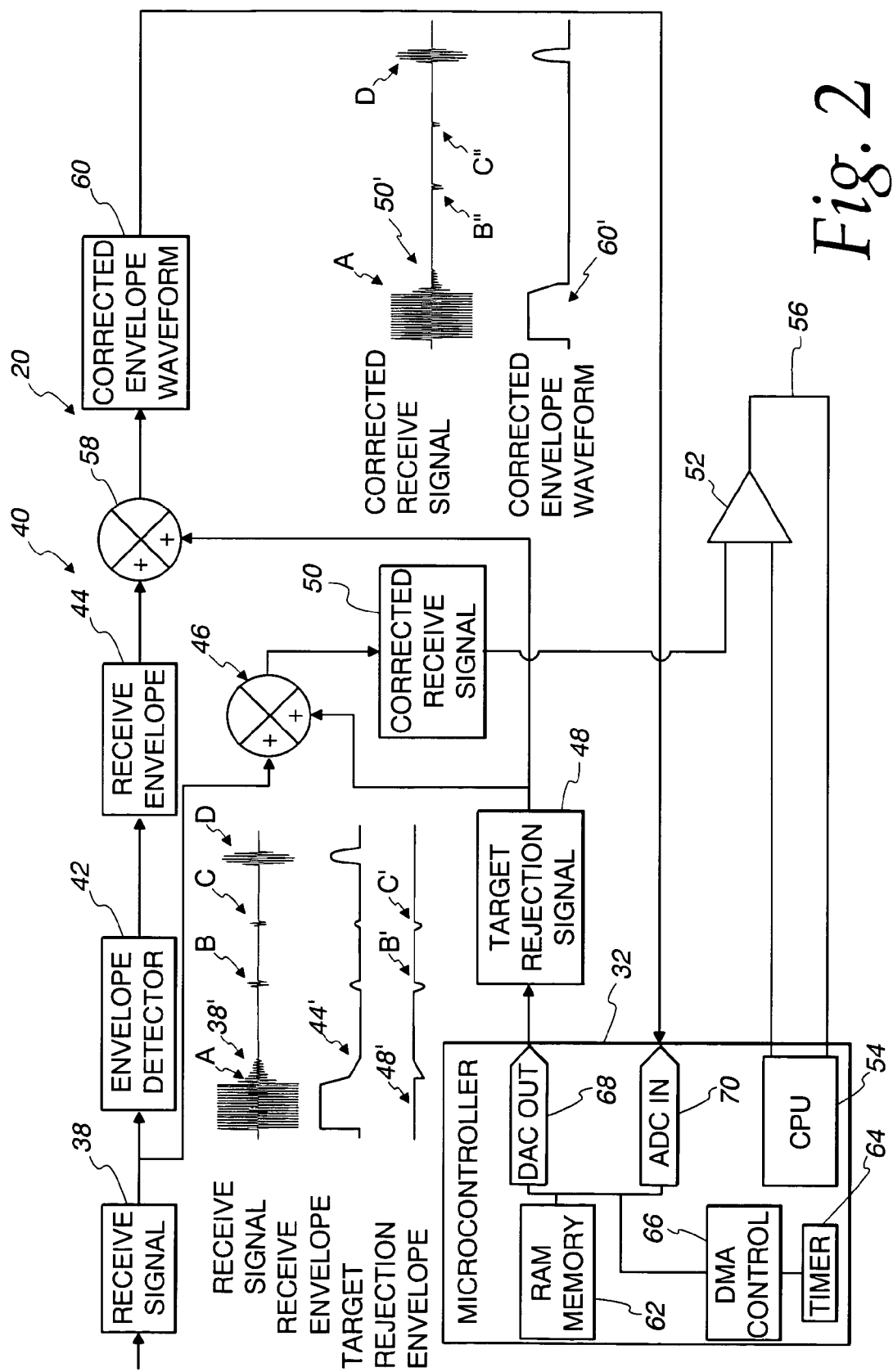
FIG. 2 is a partial block diagram of the instrument of FIG. 1.
Figure 3:
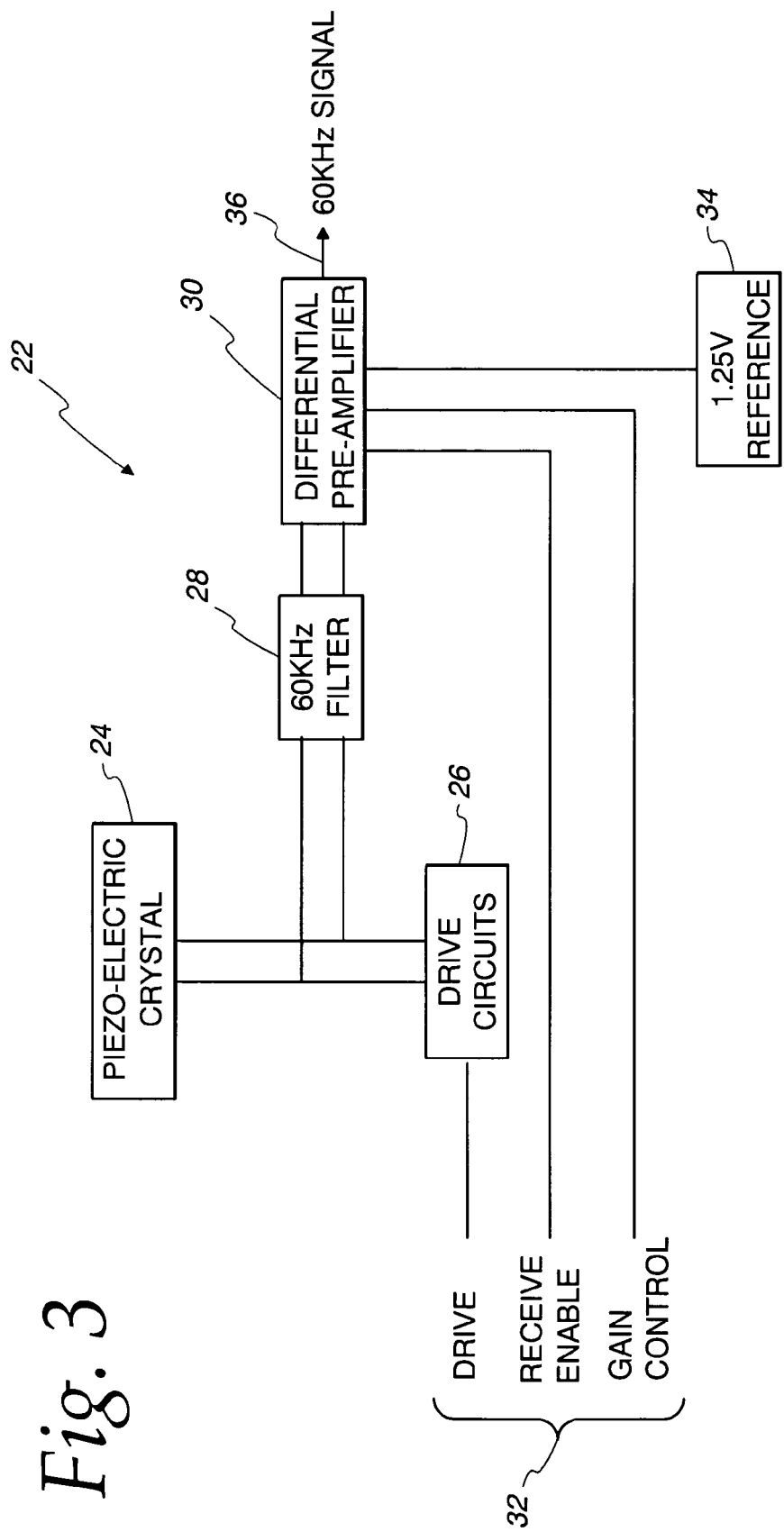
FIG. 3 is a block diagram of a sensor assembly of the instrument of FIG. 1.

Referring to FIG. 2, a block diagram of a measurement system 20 contained in the instrument control housing 12 is illustrated. This measurement system 20 is operatively connected to a sensor circuit 22, see FIG. 3, contained in the transducer 14.

The sensor circuit 22 includes a piezo-electric crystal 24 connected to a drive circuit 26 and to a filter circuit 28. The filter circuit 28 is connected to a differential preamplifier 30. The drive circuit 26 receives a drive signal from a microcontroller 32, see FIG. 2, in the form of a 60 KHz pulse signal to drive the crystal 24. Likewise, the crystal 24 receives reflected echo pulses which are passed through the filter 28 to the preamplifier 30. The preamplifier 30 receives a reference from a reference circuit 34 and develops a 60 KHz signal comprising an analog receive signal representative of the reflected echoes, as is well known. The analog receive signal is supplied on a line 36 to a receive signal block 38 of the measurement system 20, see FIG. 2.

As described, the sensor circuit 22 comprises the drive circuit 26 transmitting a pulse signal via the crystal 24 at a target of interest and a receive circuit in the form of the crystal 24, filter 28 and preamplifier 30 receive reflected echoes of the pulse signal on the line 36 representative of the reflected echoes and develop the analog signal on the line 36. In the illustrated embodiment of the invention, the sensor circuit 22 includes a single crystal 24. As is known, the sensor circuit 22 could use separate transmit and receive crystals.

Referring particularly to FIG. 2, the measurement system 20 comprises an analog processing circuit 40 and a programmed digital processing circuit in the form of the microcontroller 32. The analog processing circuit 40 is operatively coupled to the sensor circuit 22, see FIG. 3, by the receive signal block 38 receiving the analog receive signal on the line 36. The analog receive signal is illustrated by the exemplary curve 38'. An envelope detector 42 receives the analog receive signal from the receive signal block 38. The envelope detector 42 comprises a rectifier with low pass smoothing and develops an envelope waveform at a block 44. A representation of the envelope waveform, corresponding to the receive signal curve 38', is illustrated by a curve 44'.

The analog receive signal from the block 38 is also supplied to a mixer in the form of a summer 46. The summer 46 also receives a target rejection signal from a block 48. The target rejection signal is illustrated by a curve 48'. As described below, the target rejection signal 48' corresponds generally to the receive envelope 44' but having only negative pulses corresponding to false target reflections. The summer 46 adds the receive signal 38' and the target rejection signal 48' to develop a corrected receive signal at a block 50. The corrected receive signal is illustrated by the curve 50'. In the illustrated example, the receive signal 38' includes a pulse A representing the transmitted pulse, and echoes B, C and D. Echoes B and C comprise false target reflections. Pulse D represents the reflected echo for the target of interest. The target rejection signal includes corresponding negative pulses B' and C' corresponding to the false target reflections. Thus, when the receive signal 38' and the target rejection signal 48' are summed by the adder 46, the false target echoes B" and C", see curve 50', are of approximately double the magnitude, but on the negative side only. The corrected receive signal from the block 50 is supplied as one input to a comparator 52. The other input of the comparator 52 is generated by a CPU 54 of the microcontroller 32. Particularly, the CPU 54 generates a select threshold level signal. The comparator circuit compares the corrected receive signal 50' to the selected threshold level to develop a level data signal on a line 56 also supplied to the CPU 54. The level data signal on the line 56 is a discrete signal which used by the microcontroller 32 to start and stop the timer 64 to indicate the round trip transit time, discussed above. Particularly, the time of flight measurement is made by the timer 64 which counts clock ticks from a start pulse until the return echo is detected by the analog comparator circuit 52 which latches the level data signal 56 high when the echo signal has exceeded the threshold, stopping the timer 64. Because the false target echoes B" and C" are negative, they will be below the threshold. Instead, the comparator 52 is latched only by the transmitted pulse A and the target echo D. Thus, the corrected receive signal 50" effectively eliminates the false target echoes from the received signal by insuring they are below the threshold.

Figure 4:
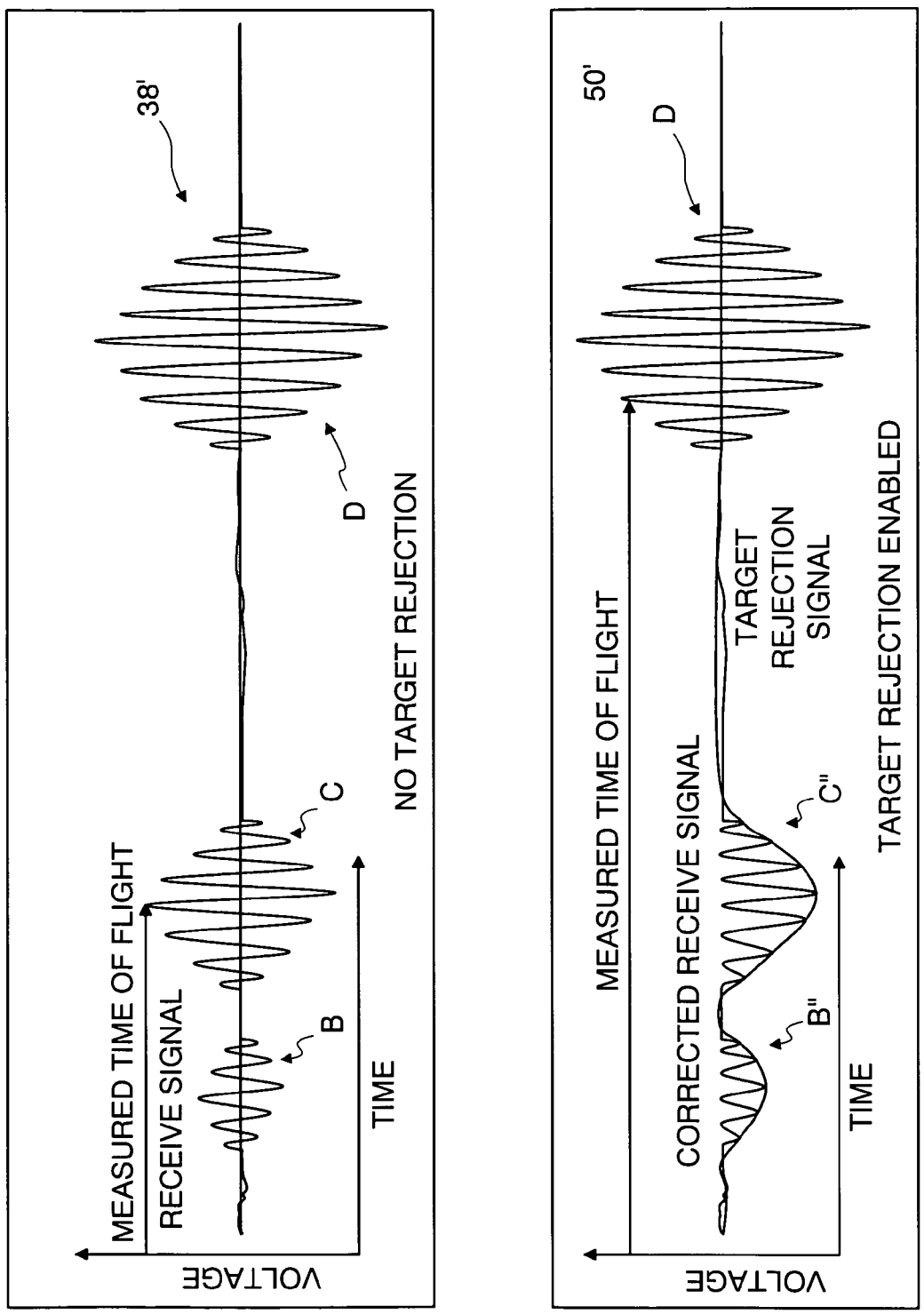
FIG. 4 is a set of curves illustrating a receive signal with and without target rejection in accordance with the invention.

FIG. 4 illustrates the measurement system 20 under typical operating conditions, with no target rejection at the top, and with target rejection enabled at the bottom. In the absence of target rejection, the full echoes B, C and D are illustrated. The corrected receive signal 50' illustrates the substantially reduced false target reflections B" and C" which will be well below the threshold for determining time of flight. As noted, with no target rejection, the second false target C would be detected by the comparator 52. Thus, the false target rejection in accordance with the invention ignores the false targets and instead operates only on the target of interest represented by the echo D.

The target rejection signal 48' from the block 48 is also supplied to a second summer 58. The receive envelope 44' is a second input to the second summer 58. Thus, the second summer 58 adds the receive envelope, see the curve 44', and the target rejection signal, see the curve 48', to develop a corrected envelope waveform at a block 60. The corrected envelope waveform is illustrated by the curve 60'. The corrected envelope waveform 60' differs from the receive envelope waveform 44' as by eliminating the false target reflections. The corrected envelope waveform is input to an ADC of the microcontroller 32.

The microcontroller 32 includes a RAM memory 62 storing target rejection signal value data representing false target reflections. A timer 64 operates in connection with a DMA controller 66. Particularly, the DMA controller 66 transfers stored target rejection signal values to a DAC 68 to develop the analog target rejection signal supplied to the block 48.

Generation of the target rejection signal at the block 48 is achieved using the DAC 68 which produces a series of voltages representing a waveform. The DAC 68 is driven by the DMA controller 66 to transfer voltage values corresponding to a previously acquired waveform, in the form of a target rejection profile, from the memory 62 to the DAC 68. The timing of the waveform voltage value as transferred by the DMA controller 66 is determined by the hardware timer 64 which is set to trigger the DMA controller 66 periodically in conjunction with the drive signal to the sensor 22, discussed above.

The signal output timing is nominally equivalent to the sample rate of the previously acquired target rejection profile. However, the output timing is expanded or contracted in the time dimension when the signal propagation speed changes. The propagation speed of an energy burst through a vapor space or other medium can vary, for example, due to changes to the medium density or temperature, which can be measured. Expansion or contraction of the target rejection signal is achieved by changing the period of the hardware timer that drives the output proportionally to the ratio of the propagation speed in effect when the target rejection profile was captured and the extant propagation speed, in accordance with the following equation:

$$TargRejOutput\ Period = \frac{Captured\ Propogation\ Velocity}{Current\ Propogation\ Velocity} * Waveform\ Capture\ Period$$

Figure 5:
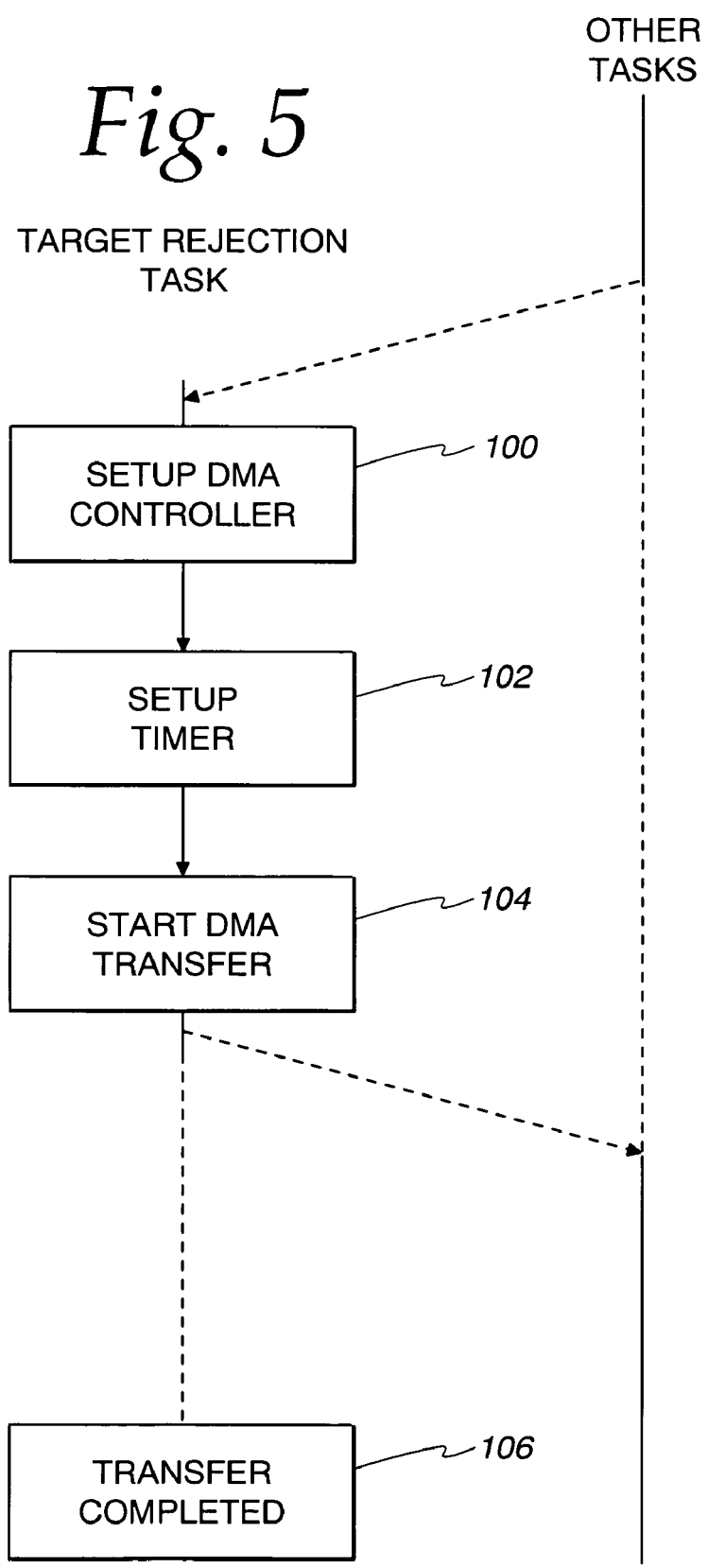
FIG. 5 is a diagram illustrating measurement system control flow implemented in the microcontroller of FIG. 2.

FIG. 5 illustrates the control flow implemented in the microcontroller 32 of FIG. 2 for the target rejection task during a scan. The flow illustrates the target rejection task in the left column and other tasks implemented in the microcontroller 32 in the right column. The microcontroller 32 triggers the start of a scan cycle. The target rejection task thereafter runs independently.

The target rejection task begins with a node 100 to set up the DMA controller. This comprises setting a DMA channel for forward source address/fixed destination address single transfer operation. The source address is set to the memory location of the target rejection profile data and the destination address to the DAC register address. The DMA transfer trigger is set as hardware timer underflow. The DMA transfer count is set to the number of target rejection profile data points. A node 102 then sets up the timer. This comprises setting the input clock source and timer mode as self reloading. The timer value is set to the desired period. This can be adjusted for propagation speed changes, if necessary. The DMA transfer is then started at a node 104. This comprises enabling the DAC 68 and DMA channel. The timer 64 is then started and is synchronized to the start of the measurement scan. As is apparent, the microcontroller 32 may perform other tasks during the transfer which operates independently of the CPU 54. Transfer is completed at a node 106.

Once the timer 64 is started, the DMA transfer proceeds to completion, automatically incrementing the source address until all target rejection signal values have been transferred to the DAC 68. The DMA channel, hardware timer and DAC are then disabled until the next measurement scan.

Figure 6:
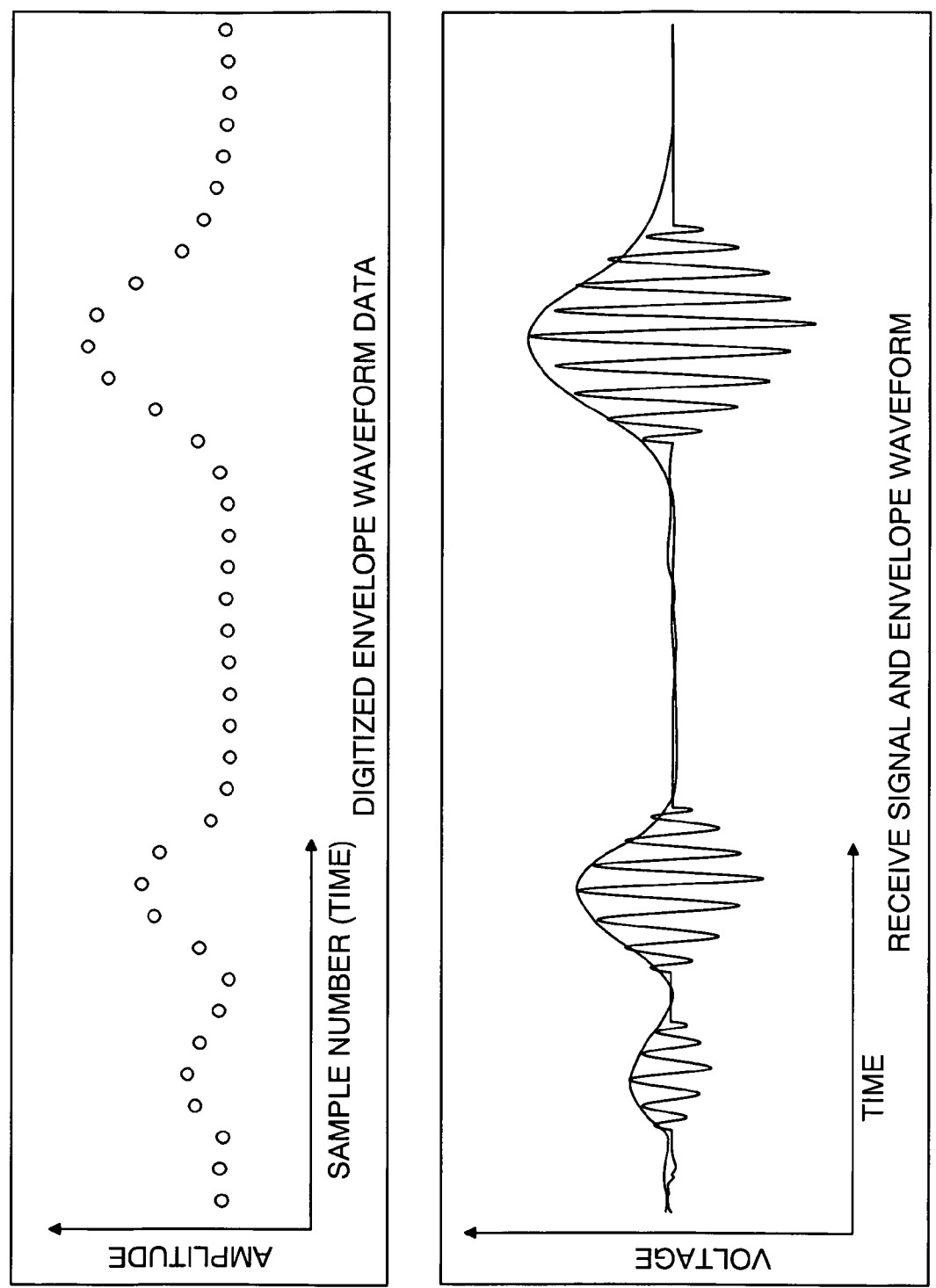
FIG. 6 is a set of curves illustrating analog and digital signals for the process instrument of FIG. 1.

FIG. 6 depicts the acquisition of the target rejection profile data required for the target rejection feature. The analog echo envelope waveform signal at the block 44 is sampled during measurement scans in order to make echo waveform data available for false target rejection, and other system purposes. This is done using the waveform data acquired by the ADC 70. The microcontroller 32 digitizes the envelope waveform signal using the ADC 70. This is illustrated at the top portion of FIG. 6. The data is precisely timed and could also use a DMA controller for efficiency. The data is accumulated as a running average of multiple acquired envelope waveform traces to provide a stable waveform representation as single waveform scans are not always reliable in real world applications due to environmental disturbances to the liquid surface and/or vapor space properties.

A portion of the acquired running average echo waveform data is designated for use as a target rejection profile when the target rejection routine is invoked by the device operator. The portion of the envelope waveform designated for the targeted rejection profile ideally corresponds to the majority of the measurement region of the application in order to capture all possible false target reflections. However, this requires the vessel to be empty. For partially filled situations, the exposed portion of the measurement region, the area between the transducer and the liquid surface, can be used. The portion of the average envelope data selected for the target rejection profile is smoothed and amplified, due to gain differences in the amplifier circuits, to create the target rejection profile. This target rejection profile data is stored in system memory 62 and is output to the analog circuit board where it is combined with the receive signal, as described above. The system can periodically update, automatically or based on user intervention, the target rejection signal value data used on measured feedback. In doing this, the target rejection signal would be effectively disabled to eliminate target rejection to determine the false target reflections, as shown in FIG. 6.

Thus, in accordance with the invention, the measurement cycle is implemented in the analog processing circuit 40. The microcontroller uses the DMA controller 66 to more efficiently transfer out the target rejection signal minimizing the use of the CPU 54. The computationally intense updating of target rejection data is performed infrequently to thus improve overall measurement system robustness.

Thus, in accordance with the invention, there is provided a measurement system with target rejection combining digital signal processing and analog hardware signal detection.

We claim:

1. A process measurement instrument with target rejection comprising:

a sensor circuit comprising a drive circuit for transmitting a pulse signal at a target of interest and a receive circuit receiving reflected echoes of the pulse signal and developing an analog receive signal representative of the reflected echoes;

an analog processing circuit operatively coupled to the sensor circuit for receiving the analog receive signal and comprising a summer subtracting an analog target rejection signal from the analog receive signal to develop a corrected receive signal; and a programmed digital processing circuit operatively coupled to the analog processing circuit and comprising a memory storing target rejection signal value data representing false target reflections and developing the analog target rejection signal for transfer to the analog processing circuit.

2. The process measurement instrument of claim 1 wherein the analog processing circuit comprises a comparator that compares the corrected receive signal to a select threshold level to develop a data signal representative of location of a target of interest.

3. The process measurement instrument of claim 1 wherein the sensor circuit comprises an ultrasonic transducer.

4. The process measurement instrument of claim 1 wherein the analog processing circuit comprises an envelope detector rectifying the analog receive signal and a second summer subtracting the analog target rejection signal from the rectified analog receive signal to develop a corrected envelope waveform delivered to the programmed digital processing circuit.

5. The process measurement instrument of claim 4 wherein the digital processing circuit periodically updates the stored target rejection signal value data using the corrected envelope waveform.

6. The process measurement instrument of claim 1 wherein the digital processing circuit comprises a direct memory access controller transferring the stored target rejection signal values to a digital to analog converter to develop the analog target rejection signal.

7. The process measurement instrument of claim 6 wherein timing of the analog target rejection signal is controllably varied responsive to signal propagation speed changes.

8. The process measurement instrument of claim 6 wherein the direct memory access controller automatically increments a source address until all target rejection signal values stored in the memory have been transferred to the digital to analog converter.

9. A through air level measurement instrument comprising:

a sensor comprising a transducer for transmitting a pulse signal at a target of interest and receiving reflected echoes of the pulse signal and developing an analog receive signal representative of the reflected echoes;

an analog processing circuit operatively coupled to the sensor circuit for receiving the analog receive signal and comprising a summer subtracting an analog target rejection signal from the analog receive signal to develop a corrected receive signal; and a programmed digital processing circuit operatively coupled to the analog processing circuit and comprising a memory storing target rejection signal value data representing false target reflections and developing the analog target rejection signal for transfer to the analog processing circuit.

10. The through air level measurement instrument of claim 9 wherein the analog processing circuit comprises a comparator that compares the corrected receive signal to a select threshold level to develop a data signal representative of location of a target of interest.

11. The through air level measurement instrument of claim 9 wherein the sensor comprises an ultrasonic transducer.

12. The through air level measurement instrument of claim 9 wherein the analog processing circuit comprises an envelope detector rectifying the analog receive signal and a second summer subtracting the analog target rejection signal from the rectified analog receive signal to develop a corrected envelope waveform delivered to the programmed digital processing circuit.

13. The through air level measurement instrument of claim 12 wherein the digital processing circuit periodically updates the stored target rejection signal value data using the corrected envelope waveform.

14. The through air level measurement instrument of claim 9 wherein the digital processing circuit comprises a direct memory access controller transferring the stored target rejection signal values to a digital to analog converter to develop the analog target rejection signal.

15. The through air level measurement instrument of claim 14 wherein timing of the analog target rejection signal is controllably varied responsive to signal propagation speed changes.

16. The through air level measurement instrument of claim 14 wherein the direct memory access controller automatically increments a source address until all target rejection signal values stored in the memory have been transferred to the digital to analog converter.

17. A through air level measurement instrument comprising:

a sensor comprising a transducer for transmitting a pulse signal at a target of interest and receiving reflected echoes of the pulse signal and developing an analog receive signal representative of the reflected echoes;

an analog processing circuit operatively coupled to the sensor circuit for receiving the analog receive signal and comprising a summer subtracting an analog target rejection signal from the analog receive signal to develop a corrected receive signal; and a microcontroller operatively coupled to the analog processing circuit to develop the analog target rejection signal and comprising a memory storing target rejection signal value data representing false target reflections and developing the analog target rejection signal for transfer to the analog processing circuit.

18. The through air level measurement instrument of claim 17 wherein the microcontroller comprises a direct memory access controller transferring the stored target rejection signal values to a digital to analog converter to develop the analog target rejection signal.

19. The through air level measurement instrument of claim 18 wherein timing of the analog target rejection signal is controllably varied responsive to signal propagation speed changes.

20. The through air level measurement instrument of claim 18 wherein the direct memory access controller automatically increments a source address until all target rejection signal values stored in the memory have been transferred to the digital to analog converter.

* * * * *